(12) United States Patent
Tan et al.

(10) Patent No.: US 12,175,558 B2
(45) Date of Patent: Dec. 24, 2024

(54) IMAGE PROCESSING METHOD AND APPARATUS

(71) Applicant: HUAWEI TECHNOLOGIES CO., LTD., Guangdong (CN)

(72) Inventors: Wei Tan, Helsinki (FI); Kun Meng, Shanghai (CN); Yun Tu, Shanghai (CN); Liang Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 312 days.

(21) Appl. No.: 17/627,951

(22) PCT Filed: Jul. 15, 2020

(86) PCT No.: PCT/CN2020/102190
§ 371 (c)(1),
(2) Date: Jan. 18, 2022

(87) PCT Pub. No.: WO2021/013019
PCT Pub. Date: Jan. 28, 2021

(65) Prior Publication Data
US 2022/0292628 A1    Sep. 15, 2022

(30) Foreign Application Priority Data

Jul. 19, 2019 (CN) .......................... 201910657456.8

(51) Int. Cl.
*G06T 1/20* (2006.01)
*G06N 3/08* (2023.01)
(Continued)

(52) U.S. Cl.
CPC ................. *G06T 1/20* (2013.01); *G06N 3/08* (2013.01); *G06T 1/60* (2013.01); *G06T 15/005* (2013.01); *G06T 15/04* (2013.01)

(58) Field of Classification Search
CPC .......... G06T 1/20; G06T 1/60; G06T 15/005; G06T 15/04; G06N 3/08
See application file for complete search history.

(56) References Cited

U.S. PATENT DOCUMENTS 8,913,068 B1    12/2014  Kokkevis et al.
9,286,657 B1 *  3/2016   Thorup, Jr. ............ H04N 19/44
(Continued)

FOREIGN PATENT DOCUMENTS

CN        101520900 A      9/2009
CN        101635004 B  *   7/2011
(Continued)

*Primary Examiner* — Ming Wu
(74) *Attorney, Agent, or Firm* — WOMBLE BOND DICKINSON (US) LLP (57) ABSTRACT

A method includes: displaying an interaction interface of an application, and when a preset operation performed by a user on the interaction interface is detected, decoding to-be-displayed image data of the application into bitmap data, and encapsulating the bitmap data into texture data; storing the texture data in a memory partition accessible to a graphics processing unit GPU; triggering the GPU to read the texture data and perform drawing processing to obtain rendered data; and triggering a display to display an image based on the rendered data.

18 Claims, 9 Drawing Sheets

(51) Int. Cl.
    *G06T 1/60*         (2006.01)
    *G06T 15/00*       (2011.01)
    *G06T 15/04*       (2011.01)

(56) References Cited

U.S. PATENT DOCUMENTS

2019/0188386 A1*   6/2019  Pogorelik ................ G06F 21/57
2019/0205736 A1*   7/2019  Bleiweiss ............. G06F 9/3887

FOREIGN PATENT DOCUMENTS

| | | | | |
|---|---|---|---|---|
| CN | 102547058 A | 7/2012 | | |
| CN | 104866318 A | 8/2015 | | |
| CN | 105096367 A | 11/2015 | | |
| CN | 105427236 A | 3/2016 | | |
| CN | 105678680 A | 6/2016 | | |
| CN | 103605534 B | 4/2017 | | |
| CN | 108694687 A * | 10/2018 | ......... | G06F 12/0815 |

* cited by examiner

IMAGE PROCESSING METHOD AND APPARATUS

CROSS-REFERENCE TO RELATED APPLICATIONS

This application is a National Stage of International Application No. PCT/CN2020/102190, filed on Jul. 15, 2020, which claims priority to Chinese Patent Application No. 201910657456.8, filed on Jul. 19, 2019. Both of the aforementioned applications are hereby incorporated by reference in their entireties.

TECHNICAL FIELD

This application relates to the field of terminal technologies, and in particular, to an image processing method and an apparatus.

BACKGROUND

Before a mobile device displays an image in an interface of an application (Application, APP), a central processing unit (CPU) of the mobile device needs to first decode the image into bitmap data and save the bitmap data in a memory partition belonging to the CPU. Then the CPU converts the bitmap data in the memory partition belonging to the CPU into texture data, and transmits the texture data to a memory partition belonging to a graphics processing unit (GPU). Finally, the GPU performs drawing based on the texture data for display on a display of the mobile device.

It may be understood that, in an image display process of the APP, one memory of the CPU needs to be occupied to store bitmap data generated through decoding in a data processing process, and one memory of the GPU further needs to be occupied to store texture data converted from the bitmap data. It can be learned that, in the foregoing technical solution, one memory needs to be allocated to the CPU, and one memory needs to be allocated to the GPU, and there is a memory occupation waste. In addition, it is relatively time-consuming to convert bitmap data into texture data and upload the texture data to the memory of the GPU, and in the image display process, a frame freezing phenomenon tends to occur, and a user cannot fluently view an image, leading to relatively poor user experience.

SUMMARY

This application provides an image processing method and an apparatus, to resolve a memory occupation waste problem in an image display processing process and a frame freezing problem that is caused by large time consumption when bitmap data is converted into texture data and the texture data is uploaded to a memory of a GPU in the conventional technology.

To achieve the foregoing objective, the following technical solutions are used in this application.

According to a first aspect, an image processing method is provided. The method may be applied to an electronic device. The method may include: The electronic device displays an interaction interface of an application, and when a preset operation performed by a user on the interaction interface is detected, and the application starts to obtain to-be-displayed image data based on an input event, decodes the to-be-displayed image data of the application into bitmap data, and encapsulates the bitmap data into texture data; stores the texture data in a memory partition accessible to a graphics processing unit GPU; triggers the GPU to read the texture data and perform drawing processing to obtain rendered data; and triggers a display to display an image based on the rendered data. It should be understood that the preset operation includes but is not limited to sliding, tapping, double-tapping, touching and holding, repressing, a mid-air gesture, shift of line-of-sight focus, or the like.

In the conventional technology, a memory allocator first applies, for a CPU, for a memory partition used to store bitmap data to be accessed by the CPU, and then applies, for a GPU, for a memory partition used to store texture data to be accessed by the GPU. However, in an embodiment of the application, a memory allocator defined by the electronic device is configured to apply for a memory partition that stores texture data and that is accessible to the graphics processing unit GPU. When the image data is decoded, the texture data generated after the image data is decoded is stored in the memory partition. In this way, there is no need to apply for a memory partition accessible to a CPU, so that a memory occupation waste problem in an image display processing process in the conventional technology can be resolved. In addition, in the process of decoding the image data in this application, there is no need to convert bitmap data into texture data and then upload the data from the memory of the CPU to the memory of the GPU, so that a frame freezing problem caused by large time consumption of data copying can be resolved, thereby improving user experience.

In an embodiment, before the decoding the to-be-displayed image data of the application into bitmap data, the method further includes: creating a software decoder; and defining a memory allocator, where the memory allocator is configured to apply for the memory partition accessible to the GPU, and the memory partition accessible to the GPU is used to store the texture data. In an embodiment, the memory allocator is improved to define the memory partition accessible to the GPU, and the memory partition is used to store the texture data generated through decoding, so that there is no need to apply for the memory accessible to the CPU, thereby reducing a memory occupation waste.

In an embodiment, that the memory allocator is configured to apply for the memory partition accessible to the GPU includes: The memory allocator is configured to invoke a first interface to apply to an internal storage for the memory partition accessible to the GPU, where the first interface is a standard interface of the GPU for applying for the memory partition, and the memory partition accessible to the GPU includes a range of physical addresses accessible to the GPU and a size of the memory partition accessible to the GPU. In an embodiment, the standard interface of the GPU for applying for the memory partition is invoked to apply for the memory, so that application for the memory of the CPU is avoided, thereby reducing a memory occupation waste.

In an embodiment, the decoding the to-be-displayed image data of the application into bitmap data, and encapsulating the bitmap data into texture data includes: decoding the first row of image data in the to-be-displayed image data to generate bitmap data of the first row of image data, and performing data conversion on the bitmap data of the first row of image data to generate texture data of the first row of image data; and then performing the foregoing processing on the second row of data in the to-be-displayed image data until processing of the last row of image data in the to-be-displayed image data is completed. In an embodiment, the image data is decoded, and parallel conversion processing is performed on the bitmap data generated through decoding, to directly obtain the texture data, so that a process of converting bitmap data stored in the memory partition of the CPU into texture data and then uploading the texture data to the memory partition of the GPU is avoided, thereby avoiding a frame freezing problem caused by large time consumption of data uploading.

In an embodiment, the decoding the first row of image data in the to-be-displayed image data to generate bitmap data of the first row of image data, and performing data conversion on the bitmap data of the first row of image data to generate texture data of the first row of image data; and then performing the foregoing processing on the second row of data in the to-be-displayed image data until processing of the last row of image data in the to-be-displayed image data is completed includes: invoking a decoding function to perform decoding processing on the first row of image data to generate the bitmap data corresponding to the first row of image data; invoking a texture conversion dynamic library to perform data type conversion processing on the bitmap data corresponding to the first row of image data, to generate the texture data corresponding to the first row of image data, where the texture conversion dynamic library includes a conversion function for converting bitmap data into texture data; and then performing the foregoing processing on the second row of image data in the to-be-displayed image data until processing of the last row of image data in the to-be-displayed image data is completed. In an embodiment, parallel acceleration processing is performed on the bitmap data to directly generate the texture data, so that a process of converting bitmap data stored in the memory partition of the CPU into texture data and then uploading the texture data to the memory partition of the GPU is avoided, thereby avoiding a frame freezing problem caused by large time consumption of data uploading.

According to a second aspect, an electronic device is provided. The electronic device includes a storage and one or more processors, the storage is coupled to the processor, the memory is configured to store computer program code, the computer program code includes computer instructions, and when the processor executes the computer instructions, the electronic device is enabled to perform the method in any one of the first aspect and the possible design manners of the first aspect.

According to a third aspect, a chip system is provided. The chip system may be applied to an electronic device; the system includes one or more interface circuits and one or more processors; the interface circuit is interconnected to the processor through a line; the interface circuit is configured to: receive a signal from a storage of the electronic device, and send the signal to the processor, where the signal includes computer instructions stored in the storage; and when the processor executes the computer instructions, the electronic device is enabled to perform the method in any one of the first aspect and the possible design manners of the first aspect.

According to a fourth aspect, a readable storage medium is provided. The readable storage medium stores instructions, and when the readable storage medium runs on an electronic device, the electronic device is enabled to perform the method in any one of the first aspect and the possible design manners of the first aspect.

According to a fifth aspect, a computer program product is provided. When the computer program product runs on a computer, the computer is enabled to perform the method in any one of the first aspect and the possible design manners of the first aspect.

It may be understood that any electronic device, chip system, readable storage medium, and computer program product provided above may be implemented according to the corresponding image display method provided above. Therefore, for beneficial effects that can be achieved by the electronic device, the chip system, the readable storage medium, and the computer program product, refer to the beneficial effects of the image display method provided above, and details are not described herein again.

DESCRIPTION OF EMBODIMENTS

Before the embodiments of this application are described, related terms designed in the technical solutions are briefly described.

A bitmap, also referred to as a dot matrix image or a grid image, includes single points called pixels (image elements). These pixels may be arranged and dyed differently to form an image.

Image data may be a local image file or a downloaded image data stream to be displayed on an electronic device. A format of the image data may be portable network graphics (PNG), JPEG (Joint Photographic Experts Group), a streaming media (Stream) file, or the like.

Bitmap data: Image data in a bitmap format that is generated after decoding processing is performed on image data may be referred to as bitmap data.

Texture data is a format of image data, is bitmap data that can represent surface details of an object, and may be image data that represents a color plane pattern or an uneven grooved pattern of an image. The texture data may be used as data that a GPU can recognize and use for drawing processing.

Rendered data: Data generated by a graphics processing unit GPU by performing a pixel rendering and pixel filling process based on texture data and a drawing instruction is referred to as rendered data. A display processing module of an electronic device may perform image display processing based on the rendered data.

Frame freezing is a phenomenon in an electronic device such as a mobile phone or a notebook computer, and is an image frame hysteresis phenomenon in operation processes of various electronic devices, for example, during game play or image display.

An application programming interface (API) is some predefined functions, and is intended to provide an application and a capability of accessing a group of routines by a developer based on software or hardware without accessing source code or understanding details of an internal working mechanism.

The electronic device involved in this application may be a device including a touchscreen, for example, a mobile phone, a tablet computer, a desktop computer, a laptop computer, a handheld computer, a notebook computer, an ultra-mobile personal computer (UMPC), a netbook, a cellular phone, a personal digital assistant (PDA), or an augmented reality (AR)/a virtual reality (VR) device.

Figure 1:
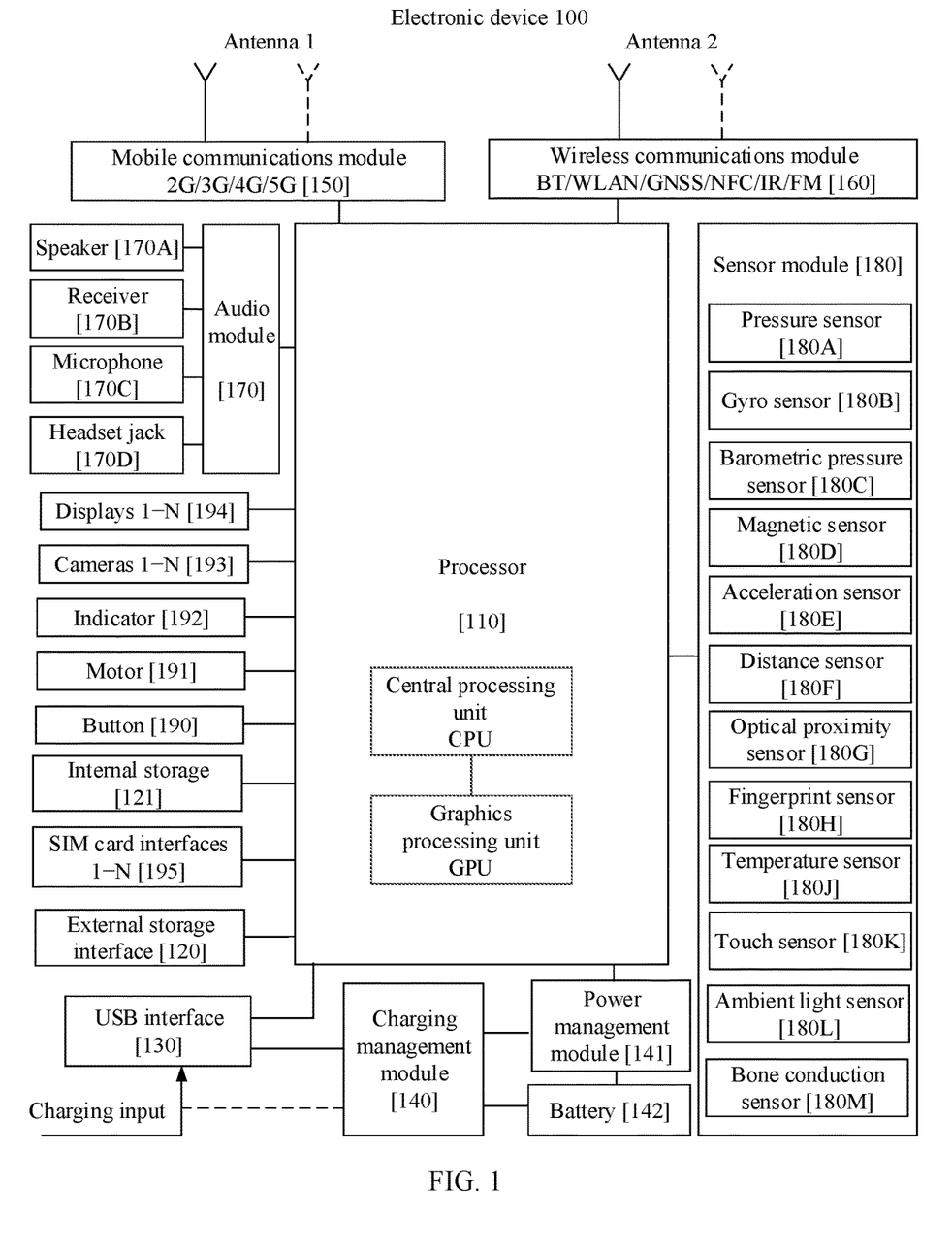
FIG. 1 is a schematic diagram of a structure of an electronic device according to an embodiment of this application.

FIG. 1 is a schematic diagram of a structure of an electronic device 100.

The electronic device 100 may include a processor 110, an external memory interface 120, an internal storage 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in an embodiment of the application does not constitute a limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. It should be understood that the processor 110 may include a central processing unit (CPU), an application processor (AP), a modem, a graphics processing unit (GPU), an image signal processor (ISP), a controller, a storage, a video codec, a digital signal processor (DSP), a baseband processor, a neural-network processing unit (NPU), and the like. Different processing units may be independent components, or may be integrated into one or more processors. As an example, only the central processing unit and the graphics processing unit are shown in the processor 110 in FIG. 1.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (universal asynchronous receiver/transmitter, UART) interface, a mobile industry processor interface (MIPI), a general-purpose input/output (GPIO) interface, a subscriber identity module (SIM) interface, a universal serial bus (USB) interface, and/or the like.

It can be understood that an interface connection relationship between the modules illustrated in an embodiment of the application is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The electronic device 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini LED, a micro LED, a micro OLED, a quantum dot light emitting diode (QLED), or the like. In some embodiments, the electronic device 100 may include one or N displays 194, where N is a positive integer greater than 1.

The external memory interface 120 may be configured to connect to an external memory card such as a micro SD card, to extend a storage capability of the electronic device 100. The external storage card communicates with the processor 110 through the external memory interface 120, to implement a data storage function. For example, files such as music and a video are stored in the external memory card.

The internal storage 121 may be configured to store computer-executable program code. The executable program code includes instructions. The processor 110 runs the instructions stored in the internal storage 121, to perform various function applications of the electronic device 100 and data processing. The internal storage 121 may include a program storage area and a data storage area. The program storage area may store an operating system, an application required by at least one function (for example, a sound playing function or an image playing function), and the like. The data storage area may store data (such as audio data and a phone book) and the like created when the electronic device 100 is used. In addition, the internal storage 121 may include a high-speed random access memory, or may include a nonvolatile memory, for example, at least one magnetic disk storage device, a flash memory, or a universal flash storage (UFS). It should be noted that in an embodiment of the application, the internal storage 121 has a same meaning as a memory described in the embodiments of this application, and a data storage area in the internal storage 121 may include a memory partition accessible to the CPU and a memory partition accessible to the GPU.

Figure 2:
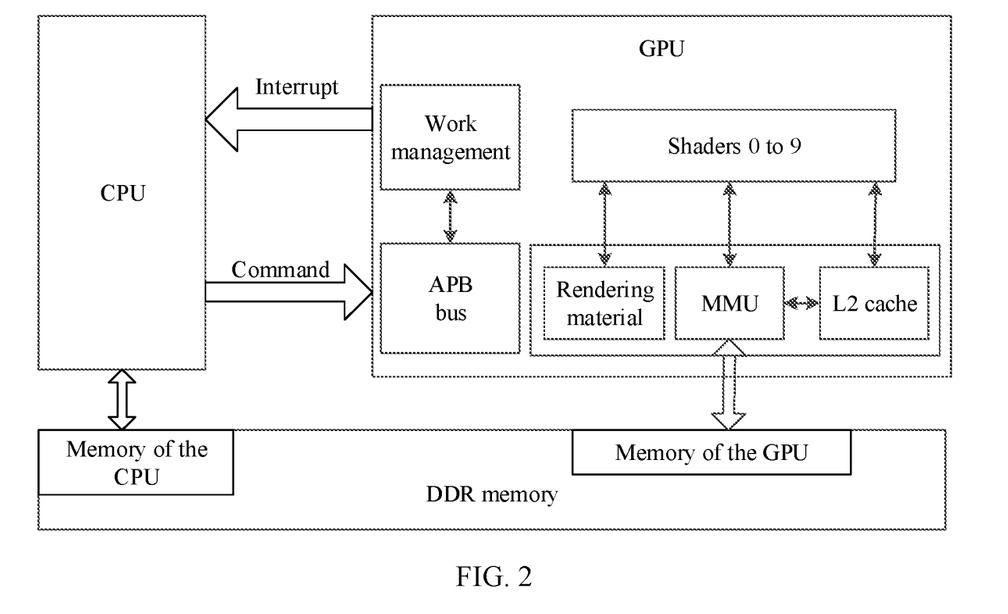
FIG. 2 is a schematic diagram of a structure of a processor and a memory of an electronic device according to an embodiment of this application.

The following describes a hardware connection relationship between the central processing unit CPU, the graphics processing unit GPU, and the memory that are included in the electronic device 100 and respective functions of the three. As shown in FIG. 2, the CPU may be a large-scale integrated circuit, is an operation core and a control center of a computer, and is mainly configured to interpret computer instructions and process computer software data.

The CPU mainly includes an operator (arithmetic logic unit, Arithmetic Logic Unit, ALU), a cache, and data and a control and status bus that associate the operator and the cache. The CPU, the internal memory, and the input/output (I/O) device are collectively referred to as three core components of an electronic computer.

The GPU, also referred to as a display core, a visual processor, or a display chip, is a microprocessor that specializes in image computing. The GPU is configured to convert and drive display information required by the electronic device, and provide a line scan signal to the display, to control correct display of the display. The GPU is an important element connecting the display and the CPU. As shown in FIG. 2, the GPU may include: a work management module, configured to manage a process of executing, by the GPU, a rendering instruction delivered by the CPU; an advanced peripheral bus (APB) module; a shader module; a rendering material; a memory management unit (MMU); and an L2 cache module. The CPU sends a command to the GPU. The command may be an instruction for rendering an image. The GPU may exchange data with the CPU by sending an interrupt.

The internal storage, simply referred to as a memory, is a component that is in the electronic device and that is configured to store data and a program, and is a bridge for communication between the CPU and the GPU. As shown in FIG. 2, the memory may be a double data rate (DDR) storage, simply referred to as a DDR memory. All programs in the electronic device run in the memory, and therefore performance of the memory greatly affects the electronic device. A data storage area in the memory may be configured to temporarily store operation data of the CPU or the GPU and data that is to be exchanged with an external storage such as a hard disk. Provided that the electronic device is running, the CPU or the GPU transfers data that needs to be operated to the memory for operation. After the operation is completed, a result is transferred from the memory. Therefore, as shown in FIG. 2, the DDR memory includes a memory partition accessible to the GPU and a memory partition accessible to the CPU.

A software system of the electronic device 100 may use a layered architecture, an event-driven architecture, a microkernel architecture, a micro service architecture, or a cloud architecture. In an embodiment of this application, an Android system of a layered architecture is used as an example to describe a software structure of the electronic device 100.

Figure 3:
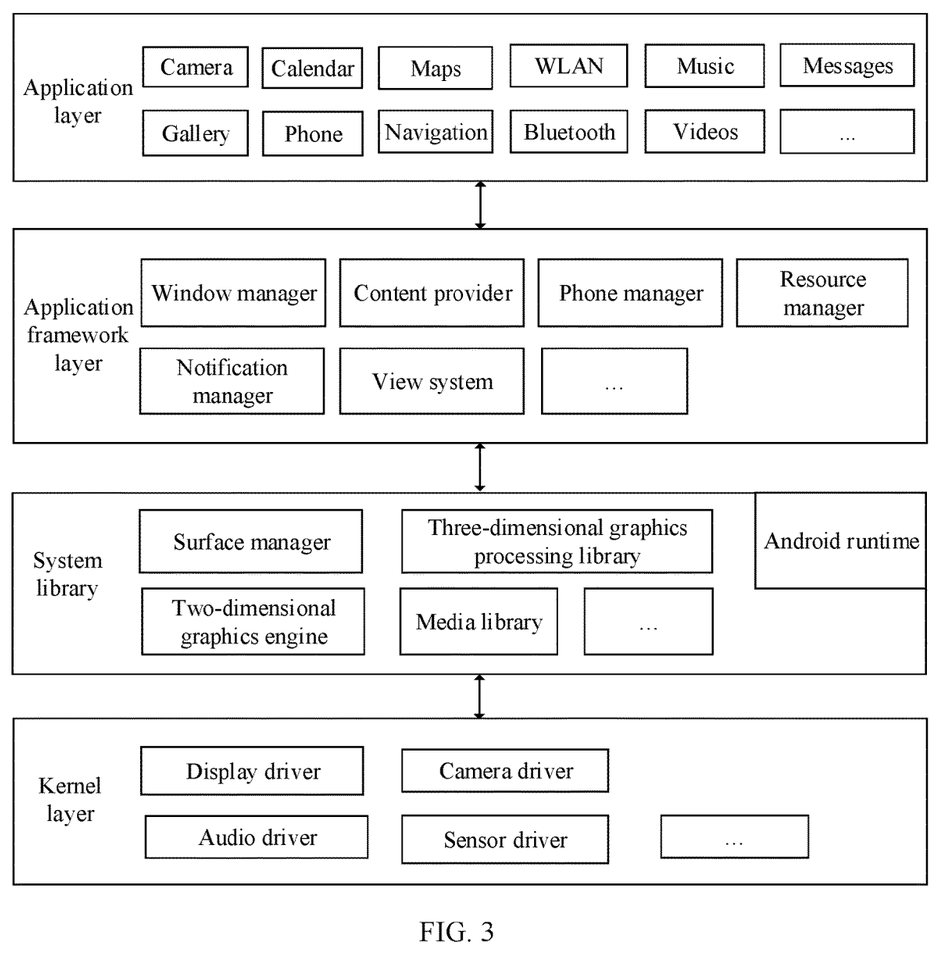
FIG. 3 is a diagram of a software structure of an electronic device according to an embodiment of this application.

FIG. 3 is a block diagram of the software structure of the electronic device 100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Videos, and Messages.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and an image display view.

The phone manager is configured to provide a communication function of the electronic device 100, for example, management of a call status (including answering or declining a call).

The resource manager provides various resources for an application, such as a localized character string, an icon, an image, a layout file, and a video file.

The notification manager enables an application to display notification information in a status bar, and may be configured to convey a notification type message. The displayed notification information may automatically disappear after a short pause and require no user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, an alert sound is uttered, the electronic device vibrates, or the indicator light blinks.

The Android runtime includes a kernel library and a virtual machine. The Android runtime is responsible for scheduling and management of the Android system.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a two-dimensional graphics engine (for example, SGL).

The surface manager is configured to: manage a display subsystem and provide fusion of two-dimensional and three-dimensional layers for a plurality of applications.

The media library supports playback and recording of audio and videos in a plurality of commonly used formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The two-dimensional graphics engine is a drawing engine for two-dimensional drawing.

The kernel layer is a layer between hardware and software. The kernel layer includes at least a display driver, a camera driver, an audio driver, and a sensor driver.

The following describes, by using an example, a working procedure of software and hardware of the electronic device 100 with reference to capturing triggering of an image display scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. In an example in which the touch operation is a touch tap operation, and a control corresponding to the tap operation is a control of a gallery application icon, the gallery application invokes an interface of the application framework layer to start the gallery application, and further starts a display driver by invoking the kernel layer, so that an image is presented by using the display 194.

Figure 4:
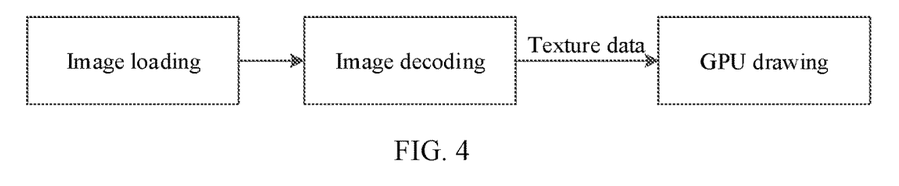
FIG. 4 is a schematic diagram of processing of an image display method according to an embodiment of this application.

An embodiment of this application provides an image processing method. As shown in FIG. 4, the method may include processing processes of image loading, image decoding, and GPU drawing.

First, an image loading process is performed on a to-be-displayed image. A mobile phone displays an interaction interface of an application. When a preset operation performed by a user on the interaction interface is detected, where for example, the preset operation may include sliding, tapping, double-tapping, touching and holding, repressing, a mid-air gesture, or shift of line-of-sight focus, the to-be-displayed image needs to be loaded to obtain to-be-displayed image data. The to-be-displayed image data may be a local image file of the mobile phone or a downloaded image data stream, and a format of the image data may be PNG, JPEG, Stream, or the like. The local image file may be an image file that is locally stored in the mobile phone and that is read by a system by using an input/output port, and the image data stream may be image data downloaded from a network by using a uniform resource locator (URL).

Next, decoding processing is performed on the image. The processing process may be a process, shown in FIG. 5, of displaying an image by an application in the mobile phone. When the application needs to display an image, bitmap data obtained through decoding by a decoder is not stored in a memory partition of a CPU, but is directly encapsulated into texture data through parallel acceleration by a texture management module, and the generated texture data is stored in a memory partition of a GPU. Therefore, memory space that is of a CPU and that is occupied by bitmap decoding in image display in the conventional technology is reduced, and a time-consuming problem caused by uploading texture data is eliminated, so that a user can fluently view an image, and user experience is improved.

Figure 5:
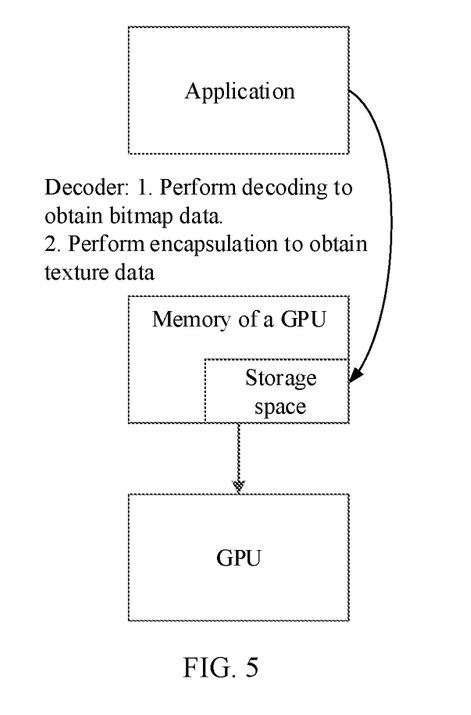
FIG. 5 is a schematic diagram of processing of another image display method according to an embodiment of this application.

Finally, the GPU drawing operation may be as follows: The GPU receives a drawing instruction sent by the CPU, and performs drawing processing on the texture data in the memory partition of the GPU. Generated rendered data is stored in the memory of the GPU and is used for next display processing.

On the premise that a principle of this application is understood, the following further describes the technical solutions of this application.

Figure 6:
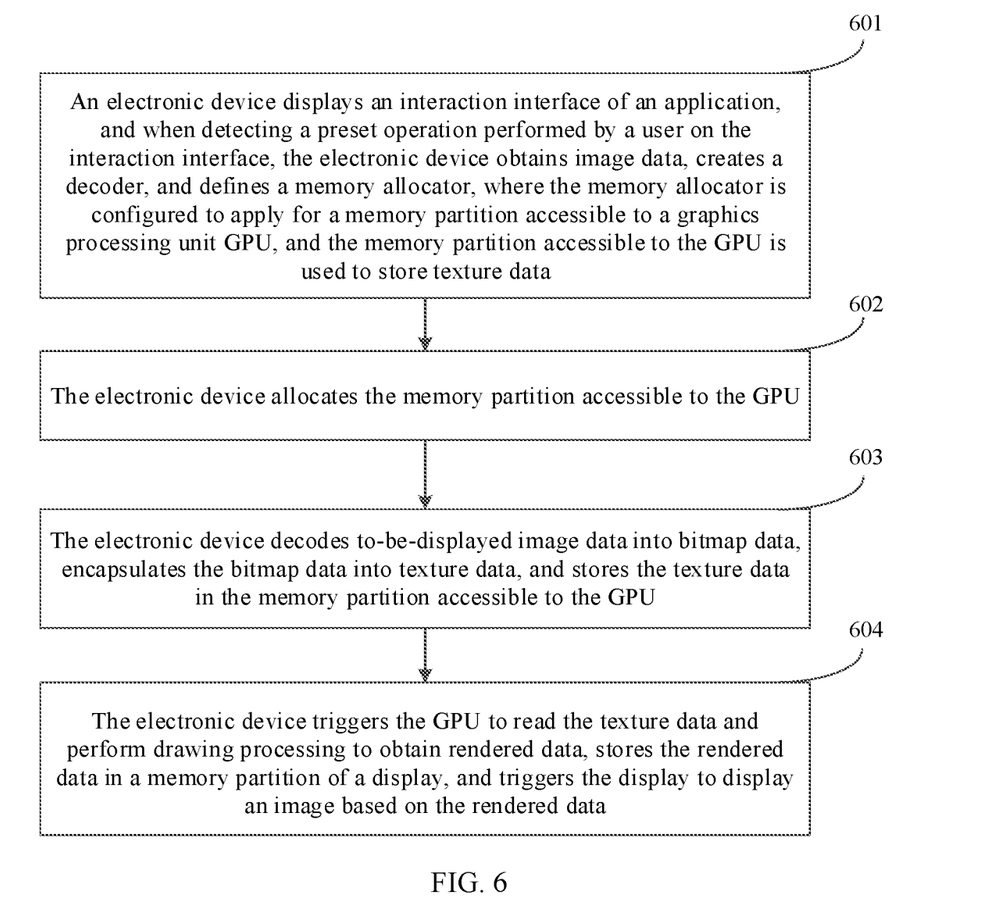
FIG. 6 is a schematic diagram of a processing procedure of an image display method according to an embodiment of this application.

As shown in FIG. 6, the image processing method may include the following operations 601 to 604.

601. An electronic device displays an interaction interface of an application, and when detecting a preset operation performed by a user on the interaction interface, the electronic device obtains image data of a to-be-displayed image, creates a decoder, and defines a memory allocator, where the memory allocator is configured to apply for a memory partition accessible to a graphics processing unit GPU, and the memory partition accessible to the GPU is used to store texture data.

It should be noted that the decoder includes a software decoder and a hardware decoder, and the software decoder is used as an example for description in an embodiment, and does not constitute a limitation on this application.

An example in which the electronic device is a mobile phone is used for description in an embodiment of the application.

Figure 7:
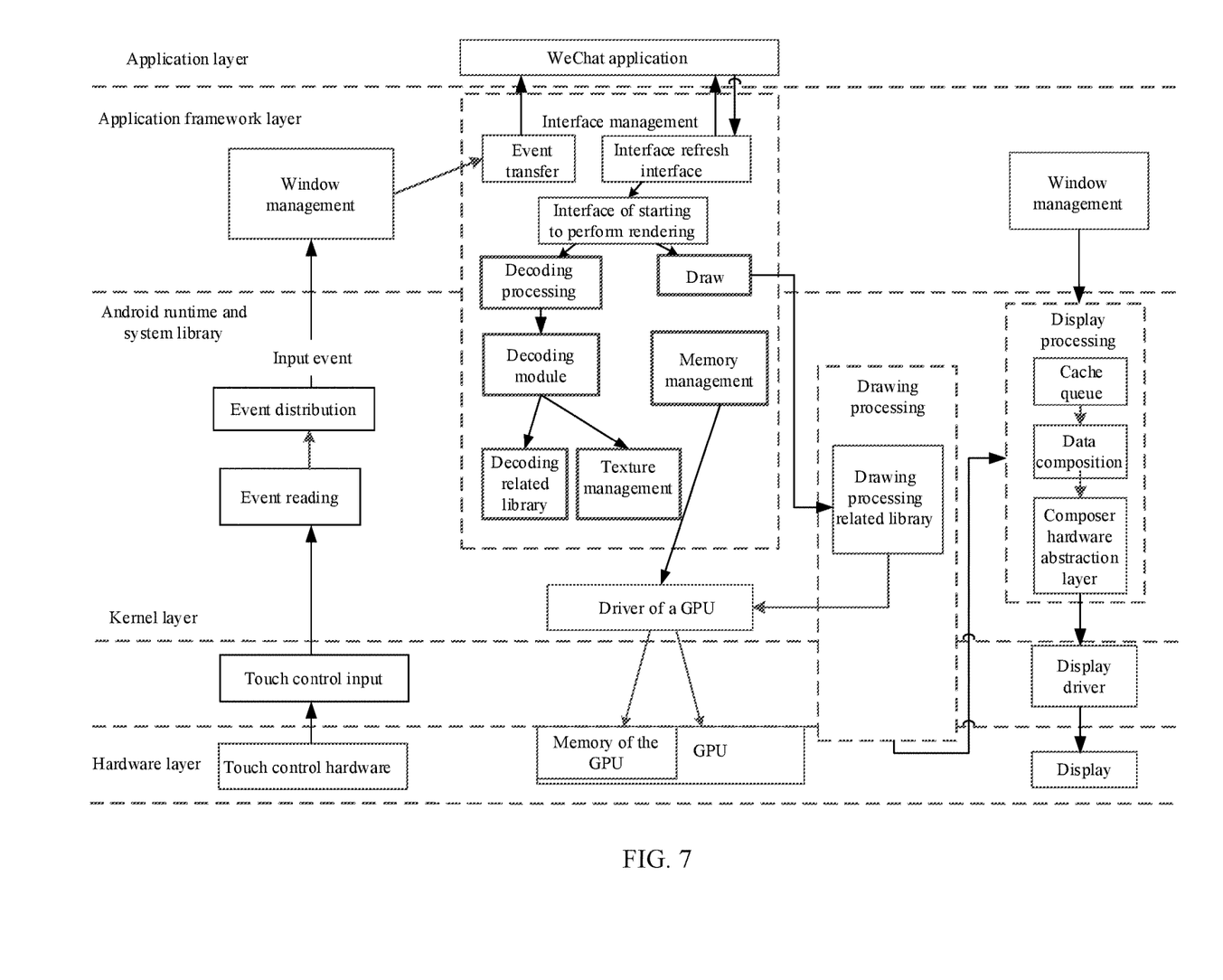
FIG. 7 is a flowchart of software processing of an image display method according to an embodiment of this application.

For example, when an application runs, the mobile phone displays an interaction interface of the application. When the mobile phone detects a sliding operation performed by the user on the interaction interface, image content displayed on a screen needs to be refreshed. As shown in FIG. 7, after receiving a triggering operation of the user, touch control hardware of a hardware layer of the mobile phone sends the input event to touch control input of a kernel layer. Then the input event undergoes event reading and event distribution of a system library. The event reading is responsible for reading the input event from the touch control input, and the event distribution is responsible for distributing the input event to window management of an application framework layer. The window management is mainly used to distribute input events to different processing modules. For example, an image display event in this application is distributed to interface management for processing, and the interface management transfers the event to a corresponding interface display area through event transfer. The interface management receives the image display event, and performs the processing process shown in FIG. 5. In this case, the window management of the application framework layer receives the input event and obtains image data. It may be understood that the window management receives an input event of an image display triggering operation, and the input event is used to trigger the to-be-displayed image data to be obtained.

The to-be-displayed image data includes an image file locally stored in the mobile phone or an image data stream downloaded by using a URL. For example, if the user taps an application "Gallery" in the mobile phone, and the mobile phone needs to display a thumbnail of an image in the gallery, a display scenario of a locally stored image is triggered. For another example, when the application is WeChat, the user performs sliding on the screen by using a finger, so that image content displayed in a display interface of WeChat needs to be changed. For the image content, an image data stream may be downloaded by using the URL, to display an image obtained after the sliding operation.

When the software decoder is created, as shown in FIG. 7, for example, when the image display triggering operation is obtained, the application invokes a decoding module in the system library by using a decoding processing interface to complete creating the software decoder. When the decoding module is invoked, a system also defines the memory allocator by invoking memory management to define a memory allocator belonging to the decoding module. In other words, when the software decoder is triggered to perform decoding, a memory allocation attribute of data generated after decoding is defined. In an embodiment of the application, texture data is obtained after the decoding module decodes the image data. Therefore, the memory partition applied for by the memory allocator defined in this application is a memory partition that stores the texture data and that is accessible to the GPU.

In an embodiment of the application, in an Android runtime and system library in a software structure, two classes are newly added to memory management, or in other words, two functions including a first function and a second function are newly added, to implement a process of memory allocation and management in image decoding processing. For example, the two newly added functions may be TextureImageAllocator and TextureImage, where TextureImageAllocator may be used to apply for allocating the memory partition accessible to the GPU, and TextureImage may be used to indicate that the memory partition is used to store texture data.

Figure 8A:
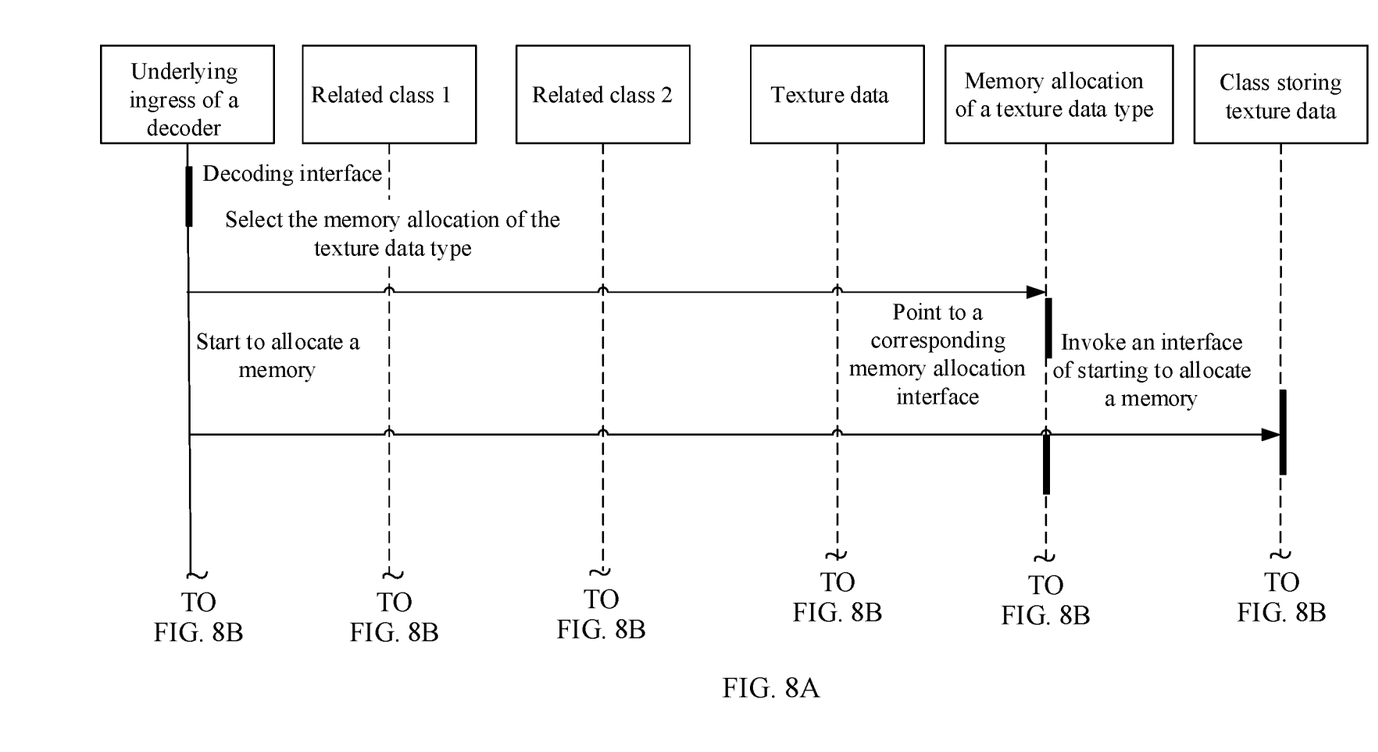
FIG. 8A and FIG. 8B are a flowchart of software processing of another image display method according to an embodiment of this application.
Figure 8B:
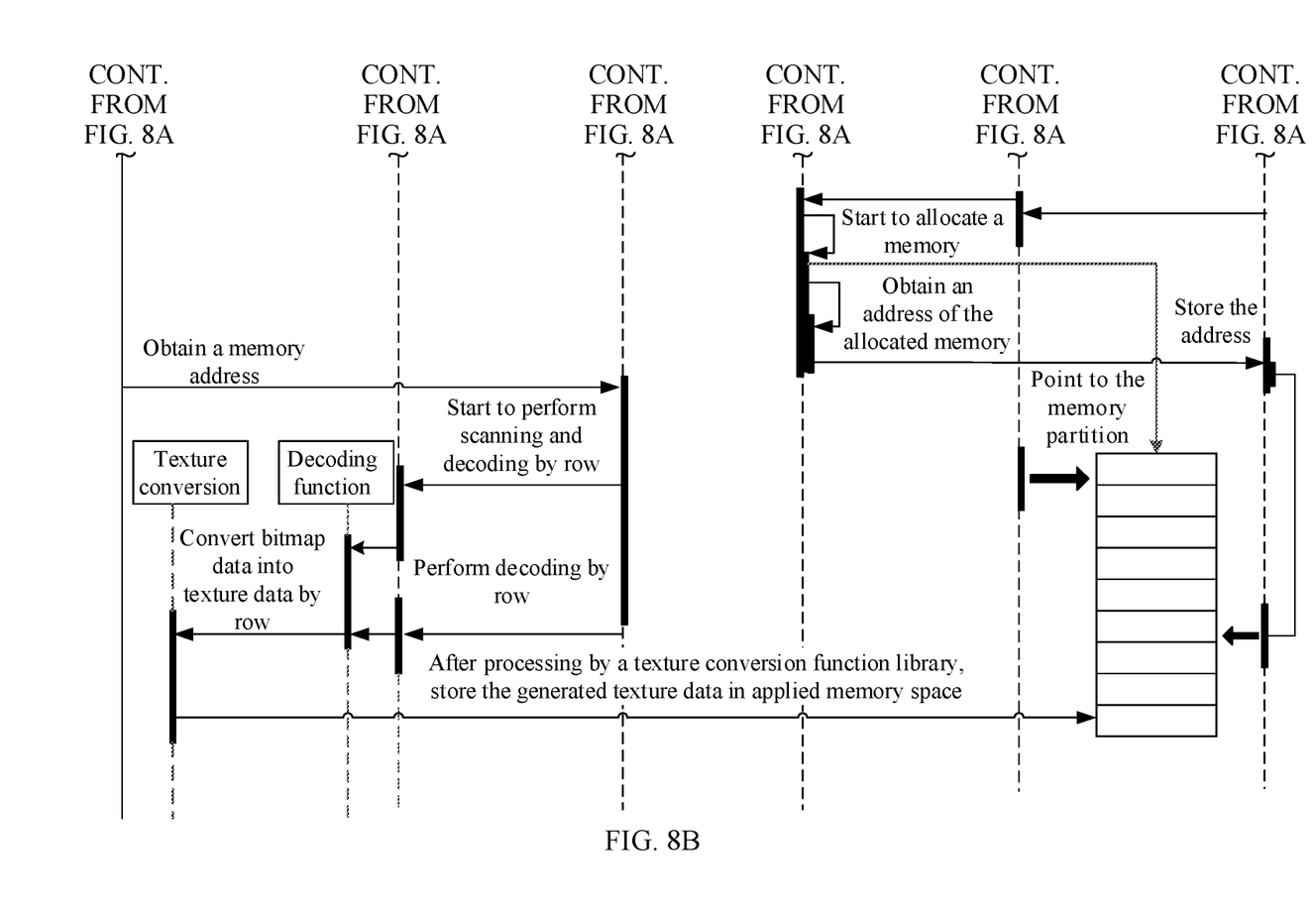

For example, an execution procedure of related software may be shown in FIG. 8A and FIG. 8B. A CPU invokes a decoding interface by using an underlying ingress of the decoder, chooses to invoke a memory allocator TextureImageAllocator of a texture data type, and then invokes a class TextureImage storing texture data, to start to apply to an internal storage for allocating a memory partition. Then the CPU invokes, by using the class storing texture data, an interface of starting to allocate a memory partition, and uses the memory allocator of the texture data type to point to a corresponding memory allocation interface to start to allocate a memory partition. After the internal storage allocates a memory partition, the CPU obtains a physical address of the allocated memory partition, and uses the physical address of the memory partition to point to a memory partition storing decoded data.

602. The electronic device allocates the memory partition accessible to the GPU.

The electronic device allocates the memory partition, and the memory allocator is configured to invoke a first interface to apply to the internal storage for the memory partition accessible to the GPU. The first interface may be a standard interface of the GPU for applying for the memory partition, and the memory partition accessible to the GPU includes a range of physical addresses accessible to the GPU and a size of the memory partition accessible to the GPU.

A process of allocating the memory partition may be as follows: The system invokes an interface of the GPU for applying for a memory. The interface is encapsulated and defined by the system, and may be used to apply for and respond to memory allocation, to implement memory allocation of the GPU. After the application, DDR address space that the GPU is authorized to access is obtained. Response data may include pointer data used to store a memory address. This application avoids a memory waste problem caused by allocating two memories in the conventional technology.

For example, the memory management invokes a standard interface of the GPU for applying for a memory, to apply to a DDR memory for a memory partition, and the DDR memory feeds back, to the GPU, a size of an allocated memory partition and a memory pointer used to indicate a physical address of the memory partition. A data storage type of the memory partition is texture data or the like.

603. The electronic device decodes the to-be-displayed image data into bitmap data, encapsulates the bitmap data into texture data, and stores the texture data in the memory partition accessible to the GPU.

The electronic device performs decoding processing on the image data by row, to generate the bitmap data. The system directly performs data type conversion processing on the generated bitmap data by row to generate the texture data for storage in the memory partition that is accessible to the GPU and that is applied for in operation 602.

In an embodiment of the application, a library for converting texture data in parallel is newly added to an Android runtime and system library layer, and is denoted as a texture conversion dynamic library libtexture. The dynamic library may convert bitmap data into texture data. In an embodiment of the application, the dynamic library libtexture may dynamically generate a conversion function based on data types of the generated bitmap data and the texture data. The conversion function is implemented by using the dynamic library libtexture, to directly generate texture data through parallel processing and an acceleration library.

An execution procedure of related software may be shown in FIG. 8A and FIG. 8B. The CPU invokes a decoding function (for example, a decoding function libjpeg), starts to perform scanning and decoding by row, and generates bitmap data after completing decoding processing on image data. Then the CPU invokes texture conversion (for example, the dynamic library libtexture), converts the bitmap data into texture data through parallel acceleration processing, and stores the generated texture data in applied memory space. Then the CPU performs next-row processing based on the foregoing procedure.

For example, the CPU invokes the decoding function libjpeg to perform decoding processing on the first row of image data to generate bitmap data corresponding to the first row of image data. The CPU invokes the texture conversion dynamic library libtexture to perform data type conversion processing on the bitmap data corresponding to the first row of image data to generate texture data corresponding to the first row of image data. The texture conversion dynamic library includes a conversion function for converting bitmap data into texture data. Then the CPU performs the foregoing processing on the second row of image data in the to-be-displayed image data until processing of the last row of image data in the to-be-displayed image data is completed.

In an embodiment of the application, a function and an algorithm for texture encapsulation are obtained by expanding a basic function of an existing decoder. For example, on the basis of a decoding function of libjpeg, the dynamic library libtexture is added based on an existing decoding capability, and parallel decoding processing and data type conversion are performed on data generated through decoding by libjpeg, to generate texture data, so that a frame freezing phenomenon that may be caused by a time-consuming texture conversion and uploading process in the conventional technology is avoided, thereby improving user experience.

604. The electronic device triggers the GPU to read the texture data and perform drawing processing to obtain rendered data, stores the rendered data in a memory partition of a display, and triggers the display to display an image based on the rendered data.

Further, the GPU may perform drawing processing based on the texture data and a drawing instruction to obtain the rendered data. As shown in FIG. 7, the rendered data is stored in the memory of the GPU, and after data composition (SurfaceFlinger) of display processing obtains the memory of the GPU, the rendered data is stored, by using a composer hardware abstraction layer and a display driver, in a memory of a liquid crystal display (Liquid Crystal Display, LCD) for display by the liquid crystal display LCD.

In an embodiment of the application, adding and improvement are performed on the application framework layer and the system library of the system, to directly perform parallel processing after the image data is decoded to generate the texture data and store the texture data in the memory partition applied for by the GPU, so that the GPU performs drawing processing based on the texture data, thereby resolving a waste problem of applying for two memories for a CPU and a GPU in the conventional technology, also resolving a time-consuming problem of copying data from a memory of the CPU to a memory of the GPU, reducing frame freezing phenomena, and improving user experience.

Some other embodiments of this application provide an electronic device. The electronic device may include a storage and one or more processors, and the storage is coupled to the processor. The memory is configured to store computer program code. The computer program code includes computer instructions. When the processor executes the computer instructions, the electronic device may perform functions or operations in the foregoing method embodiment. For a structure of the electronic device, refer to the structure of the electronic device 100 shown in FIG. 1.

Figure 9:
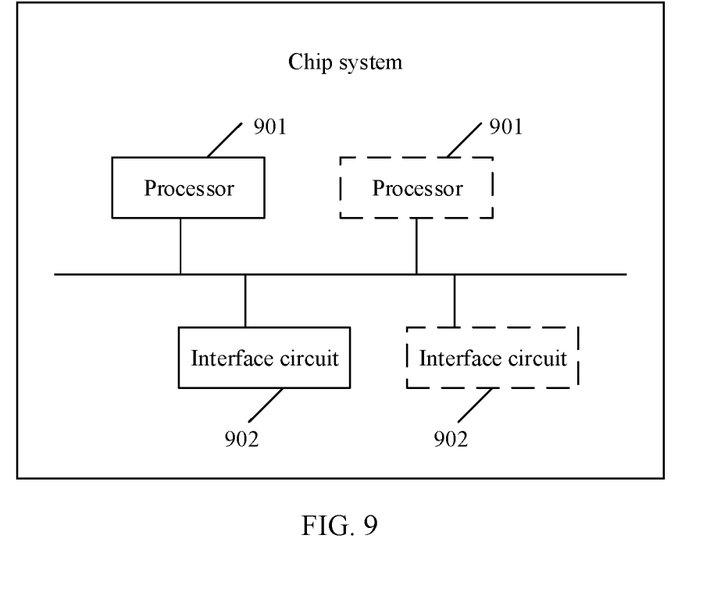
FIG. 9 is a schematic diagram of a structure of a chip system according to an embodiment of this application.

An embodiment of this application further provides a chip system. The chip system may be applied to the electronic device in the foregoing embodiment. As shown in FIG. 9, the chip system includes at least one processor 901 and at least one interface circuit 902. The processor 901 and the interface circuit 902 may be connected to each other through a line. For example, the interface circuit 902 may be configured to receive a signal from another apparatus (for example, the memory in the electronic device). For another example, the interface circuit 902 may be configured to send a signal to another apparatus (for example, the processor 901). For example, the interface circuit 902 may read the instructions stored in the memory, and send the instructions to the processor 901. When the processor 901 executes the instructions, the electronic device may perform functions or operations performed by the electronic device in the foregoing embodiment. Certainly, the chip system may further include another discrete device. This is not limited in an embodiment of the application.

An embodiment of this application further provides a computer storage medium. The computer storage medium includes computer instructions, and when the computer instructions are run on the foregoing electronic device, the electronic device is enabled to perform the functions or operations performed by the mobile phone in the foregoing method embodiments.

An embodiment of this application further provides a computer program product. When the computer program product runs on a computer, the computer is enabled to perform the functions or operations performed by the mobile phone in the foregoing method embodiments.

The foregoing descriptions about implementations allow one or ordinary skilled in the art to understand that, for convenient and brief description, division into the foregoing function modules is merely used as an example for illustration. During actual application, the foregoing functions may be allocated to and implemented by different function modules according to a requirement, in other words, an inner structure of an apparatus is divided into different function modules to implement all or some of the functions described above.

In the several embodiments provided in this application, it should be understood that the disclosed apparatus and method may be implemented in another manner. For example, the foregoing apparatus embodiment is merely an example. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located in one place, or may be distributed to different places. A part or all of the units may be selected according to an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

Finally, it should be noted that the foregoing descriptions are merely implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. An image processing method, comprising:
applying for a memory partition accessible by a graphics processing unit (GPU);
displaying an interaction interface of an application;
in response to detecting a preset operation performed by a user on the interaction interface, decoding image data of the application into bitmap data, and encapsulating the bitmap data into texture data;
storing the texture data in the memory partition accessible by the GPU directly without using a memory partition specifically allocated to a central processing unit (CPU), wherein the bitmap data obtained through decoding by a decoder is not stored in the memory partition of the CPU, but is directly encapsulated into the texture data through parallel acceleration by a texture management module;
triggering the GPU to read the texture data directly and perform drawing processing based on the texture data to obtain rendered data; and
triggering a display to display an image based on the rendered data.

2. The method according to claim 1, wherein applying for the memory partition accessible by the GPU comprises:
invoking a first interface to apply to an internal storage for the memory partition accessible to the GPU, wherein the first interface is a standard interface of the GPU for applying for the memory partition, and wherein the memory partition accessible to the GPU comprises a range of physical addresses accessible to the GPU and a size of the memory partition accessible to the GPU.

3. The method according to claim 2, wherein the decoding to-be-displayed image data of the application into the bitmap data, and encapsulating the bitmap data into the texture data comprises:
for each row of a plurality of rows of the image data,
decoding the row of image data to generate bitmap data of the row of image data, and
performing data conversion on the bitmap data of the row of image data to generate texture data of the row of image data.

4. The method according to claim 3, further comprising:
for each row of the plurality of rows of image data,
invoking a decoding function to perform decoding processing on the row of image data to generate the bitmap data corresponding to the row of image data; and
invoking a texture conversion dynamic library to perform data type conversion processing on the bitmap data corresponding to the row of image data, to generate the texture data corresponding to the row of image data, wherein the texture conversion dynamic library comprises a conversion function for converting the bitmap data into the texture data.

5. The method according to claim 1, wherein the decoding image data of the application into the bitmap data, and encapsulating the bitmap data into the texture data comprises:
for each row of a plurality of rows of the image data,
decoding the row of image data to generate bitmap data of the row of image data, and
performing data conversion on the bitmap data of the row of image data to generate texture data of the row of image data.

6. The method according to claim 5, further comprising:
for each row of the plurality of rows of the image data,
invoking a decoding function to perform decoding processing on the row of image data to generate the bitmap data corresponding to the row of image data; and
invoking a texture conversion dynamic library to perform data type conversion processing on the bitmap data corresponding to the row of image data, to generate the texture data corresponding to the row of image data, wherein the texture conversion dynamic library comprises a conversion function for converting the bitmap data into the texture data.

7. An electronic device, comprising:
a processor,
a storage coupled to the processor, and
a memory coupled to the processor to store instructions, which when executed by the processor, cause the processor to perform the operations, the operations comprising:
applying for a memory partition accessible by a graphics processing unit (GPU);
displaying an interaction interface of an application;
in response to detecting a preset operation performed by a user on the interaction interface, decoding image data of the application into bitmap data;
encapsulating the bitmap data into texture data;
storing the texture data in the memory partition accessible by the GPU directly without using a memory partition specifically allocated to a central processing unit (CPU), wherein the bitmap data obtained through decoding by a decoder is not stored in the memory partition of the CPU, but is directly encapsulated into the texture data through parallel acceleration by a texture management module;
triggering the GPU to read the texture data directly and perform drawing processing based on the texture data to obtain rendered data; and
triggering a display to display an image based on the rendered data.

8. The electronic device according to claim 7, wherein applying for a memory partition comprises:
invoking a first interface to apply to an internal storage for the memory partition accessible to the GPU, wherein the first interface is a standard interface of the GPU for applying for the memory partition, and wherein the memory partition accessible to the GPU comprises a range of physical addresses accessible to the GPU and a size of the memory partition accessible to the GPU.

9. The electronic device according to claim 8, wherein the decoding image data of the application into the bitmap data, and encapsulating the bitmap data into the texture data comprises:
for each row of a plurality of rows of the image data,
decoding the row of image data to generate bitmap data of the row of image data;
performing data conversion on the bitmap data of the row of image data to generate texture data of the row of image data.

10. The electronic device according to claim 9, further comprising:
for each row of a plurality of rows of the image data,
invoking a decoding function to perform decoding processing on the row of image data to generate the bitmap data corresponding to the row of image data; and invoking a texture conversion dynamic library to perform data type conversion processing on the bitmap data corresponding to the row of image data, to generate the texture data corresponding to the first row of image data, wherein the texture conversion dynamic library comprises a conversion function for converting the bitmap data into the texture data.

11. The electronic device according to claim 7, wherein the decoding image data of the application into the bitmap data, and encapsulating the bitmap data into the texture data comprises:
for each row of a plurality of rows of the image data,
decoding the row of image data to generate bitmap data of the row of image data, and
performing data conversion on the bitmap data of the row of image data to generate texture data of the row of image data.

12. The electronic device according to claim 11, further comprising:
for each row of a plurality of rows of the image data,
invoking a decoding function to perform decoding processing on the row of image data to generate the bitmap data corresponding to the row of image data; and
invoking a texture conversion dynamic library to perform data type conversion processing on the bitmap data corresponding to the row of image data, to generate the texture data corresponding to the row of image data, wherein the texture conversion dynamic library comprises a conversion function for converting the bitmap data into the texture data.

13. A non-transitory machine-readable storage medium having instructions stored therein, which when executed by a processor, cause the processor to perform operations, the operations comprising:
applying for a memory partition accessible by a graphics processing unit (GPU);
displaying an interaction interface of an application;
in response to detecting a preset operation performed by a user on the interaction interface, decoding image data of the application into bitmap data;
encapsulating the bitmap data into texture data;
storing the texture data in the memory partition accessible by the GPU directly without using a memory partition specifically allocated to a central processing unit (CPU), wherein the bitmap data obtained through decoding by a decoder is not stored in the memory partition of the CPU, but is directly encapsulated into the texture data through parallel acceleration by a texture management module;
triggering the GPU to read the texture data directly and perform drawing processing based on the texture data to obtain rendered data; and
triggering a display to display an image based on the rendered data.

14. The non-transitory machine-readable storage medium according to claim 13, wherein applying for a memory partition comprises:

invoking a first interface to apply to an internal storage for the memory partition accessible to the GPU, wherein the first interface is a standard interface of the GPU for applying for the memory partition, and wherein the memory partition accessible to the GPU comprises a range of physical addresses accessible to the GPU and a size of the memory partition accessible to the GPU.

15. The non-transitory machine-readable storage medium according to claim 14, wherein the decoding image data of the application into the bitmap data, and encapsulating the bitmap data into the texture data comprises:
for each row of a plurality of rows of the image data,
decoding the row of image data to generate bitmap data of the row of image data, and
performing data conversion on the bitmap data of the row of image data to generate texture data of the row of image data.

16. The non-transitory machine-readable storage medium according to claim 15, wherein the operations further comprise:
for each row of the plurality of rows of the image data,
invoking a decoding function to perform decoding processing on the row of image data to generate the bitmap data corresponding to the row of image data; and
invoking a texture conversion dynamic library to perform data type conversion processing on the bitmap data corresponding to the row of image data, to generate the texture data corresponding to the row of image data, wherein the texture conversion dynamic library comprises a conversion function for converting the bitmap data into the texture data.

17. The non-transitory machine-readable storage medium according to claim 13, wherein the decoding image data of the application into the bitmap data, and encapsulating the bitmap data into the texture data comprises:
for each row of a plurality of rows of the image data,
decoding the row of image data to generate bitmap data of the row of image data, and
performing data conversion on the bitmap data of the row of image data to generate texture data of the row of image data.

18. The non-transitory machine-readable storage medium according to claim 17, wherein the operations further comprise:
for each row of the plurality of rows of the image data,
invoking a decoding function to perform decoding processing on the row of image data to generate the bitmap data corresponding to the row of image data; and
invoking a texture conversion dynamic library to perform data type conversion processing on the bitmap data corresponding to the row of image data, to generate the texture data corresponding to the row of image data, wherein the texture conversion dynamic library comprises a conversion function for converting the bitmap data into the texture data.

* * * * *